United States Patent Office 2,904,554
Patented Sept. 15, 1959

2,904,554

PHTHALIDES

Donald D. Wheeler and David C. Young, Midland, Mich., assignors to The Dow Chemical Company, Midland, Mich., a corporation of Delaware No Drawing. Application September 2, 1958
Serial No. 758,598

3 Claims. (Cl. 260—326)

This invention is concerned with phthalides having the structure

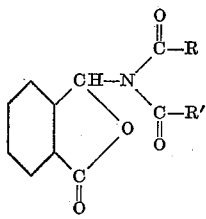

In this and succeeding formulae, R and R' may be phenyl or lower alkyl containing from 1 to 4 carbon atoms, inclusive, or R and R' taken together may be a phenylene or naphthylene radical attached through valences in adjacent exposed positions on the aromatic nucleus, an alkylene radical containing from 2 to 3 carbon atoms, inclusive, or an alkenylene radical containing 2 carbon atoms. By the expression "adjacent exposed positions on the aromatic nucleus" is meant the "ortho" positions in the benzene nucleus, or the "ortho" or "peri" positions on the naphthalene nucleus.

The products of this invention are light-colored solids, somewhat soluble in organic solvents such as acetone and ethanol, and substantially insoluble in water and petroleum ether. These compounds have utility in agricultural chemicals, as herbicides for the control of undesirable vegetation and as fungicides for the protection of plants against infestation by fungi.

The above compounds may be prepared by causing phthalaldehydic acid to react with an acid imide having the structure

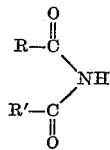

to produce the desired phthalide and water of reaction. The expression "imide" as herein employed refers to the disubstituted ammonia derivatives having the grouping

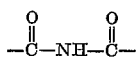

wherein the free valences are attached to carbon atoms and are inclusive of the non-cyclic diacyl derivatives of ammonia such as diacetamide, dibutyramide, divaleramide, dibenzamide, N-propionylbenzamide, N-butyrylbenzamide and N-acetylbenzamide, and the cyclic imides such as succinimide, glutarimide, phthalimide, naphthalimide, maleimide, pyrotartrimide, 1,2-naphthalenedicarboximide, and 2,3-naphthalenedicarboximide.

The terms "phthalaldehydic acid" and "3-hydroxyphthalide" refer to a compound having the structure

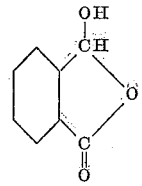

Phthalaldehydic acid is often represented in the literature as having the structure

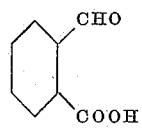

However, the acid employed in this invention and prepared as hereinafter described exists almost entirely in the closed ring 3-hydroxyphthalide structure as observed from a study of its infrared absorption spectrum. Infrared data also indicate the phthalide products of the invention to have a closed ring 3-hydroxyphthalide structure.

In the synthesis good results are obtained when an equimolar proportion or a slight excess of the acid imide is employed. The reaction takes place smoothly in the temperature range of from 100° to 200° C. but a range of from 130° to 170° C. is considered preferable. If desired, the reaction may be carried out in a solvent such as dimethylformamide.

In a preferred method of carrying out the reaction, the reactants are mixed together and heated for a period of from 3 to 6 hours. During the heating, the product and water of reaction are formed. Following the reaction, the product may be isolated and purified by conventional methods. For example, the reaction product may be isolated from the reaction mixture by (1) pouring into water to precipitate the desired product, (2) separating the precipitated product by filtration or decantation, (3) washing with an appropriate agent or agents such as water, organic solvent or dilute alkali to remove unreacted material, and (4) filtering to recover the product. This product may be further purified, if desired, by recrystallization from organic solvent or solvent combinations. Where no solvent is used in carrying out the reaction, the product may be isolated by an alternative procedure wherein the reaction mixture is cooled and the resulting solid mass repeatedly washed with or recrystallized from an appropriate solvent.

The following examples illustrate the invention, but are not to be construed as limiting.

*Example 1.—3-succinimidophthalide*

49.5 grams (0.5 mole) of succinimide and 75.0 grams (0.5 mole) of phthalaldehyde acid were mixed together and heated in the temperature range of from 160° to 170° C. for 5 hours. The mixture was then cooled and poured into 800 milliliters of water whereupon a tan-colored solid precipitated. The water was decanted therefrom and the solid washed successively with water and acetone, and filtered to obtain a white, solid, 3-succinimidophthalide product melting at 245°–250° C.

*Example 2.—3-phthalimidophthalide*

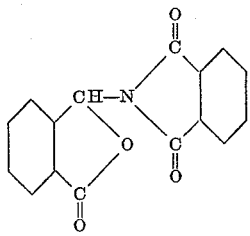

73.5 grams (0.5 mole) of phthalimide and 75.0 grams (0.5 mole) of phthalaldehydic acid were mixed and heated to 140°–150° C. and maintained in that temperature range for 3 hours. At the end of the heating period, the mixture was cooled to obtain a solid mass. The solid mixture was extracted with ethanol to obtain two fractions. Each fraction was fractionally crystallized from acetone-water mixture and the crystals obtained therefrom combined and successively washed first with 10 percent sodium hydroxide solution and then with water to obtain a 3-phthalimidophthalide product melting at 212°–213° C.

*Example 3.—3-maleimidophthalide*

48.5 grams (0.5 mole) of maleimide and 75.0 grams (0.5 mole) of phthalaldehydic acid are mixed together and heated in the temperature range of from 150° to 160° C. for 4 hours. The mixture is then cooled and poured into 800 milliliters of water whereupon a solid precipitates. The latter is recovered by filtration and washed successively with dilute alkali, water and acetone to obtain a 3-maleimidophthalide product having a molecular weight of 229.

*Example 4.—3-naphthalimidophthalide*

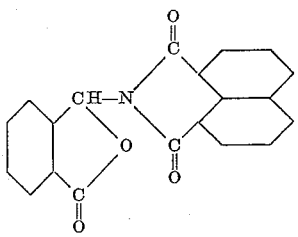

98.5 grams (0.5 mole) of naphthalimide, 75.0 grams (0.5 mole) of phthalaldehydic acid and 200 milliliters of dimethylformamide are mixed together and heated in the temperature range of from 150° to 155° C. for 6 hours. The mixture is then cooled and poured into 800 milliliters of water whereupon a solid precipitates. The latter is recovered by filtration and washed successively with dilute alkali and water to obtain a naphthalimidophthalide product having a molecular weight of 329.

*Example 5.—3-N-acetylbenzamidophthalide*

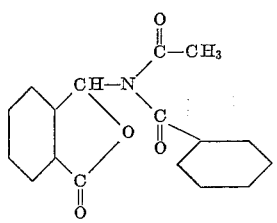

81.5 grams (0.5 mole) of N-acetylbenzamide and 75.0 grams (0.5 mole) of phthalaldehydic acid are mixed together and heated in the temperature range of from 150° to 160° C. for 4 hours. The mixture is then cooled and poured into 800 milliliters of water whereupon a solid precipitates. The latter is recovered by filtration and washed successively with dilute alkali, water and acetone to obtain a 3-N-acetylbenzamidophthalide product having a molecular weight of 295.

*Example 6.—3-diacetamidophthalide*

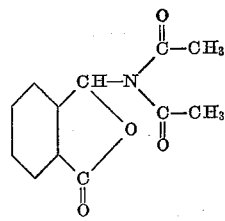

50.53 grams (0.5 mole) of diacetamide and 75.0 grams (0.5 mole) phthalaldehydic acid are mixed together and heated in the temperature range of from 150° to 160° C. for 4 hours. The mixture is then cooled and poured into 800 milliliters of water whereupon a solid precipitates. The latter is recovered by filtration and washed successively with dilute alkali, water and acetone to obtain a diacetamidophthalide product having a molecular weight of 233.

In similar preparations, the following compounds are prepared:

3-glutarimidophthalide having a molecular weight of 245 by the reaction of phthalaldehydic acid with glutarimide.

3-pyrotartrimidophthalide having a molecular weight of 231 by the reaction of phthalaldehydic acid with pyrotartrimide.

3- dibenzamidophthalide having a molecular weight of 357 by the reaction of phthalaldehydic acid with dibenzamide.

3-dipropionamidophthalide having a molecular weight of 261 by the reaction of phthalaldehydic acid with dipropionamide.

Other phthalides embraced in the present invention include 3-N-butyrylbenzamidophthalide, 3-N-acetylcaleramidophthalide, 3 - (1,2 - naphthalenedicarboximido) phthalide and 3-N-propionylbenzamidophthalide.

The above compounds are useful as herbicides for the control of undesirable vegetation and for the sterilization of soil with regard to plant growth. In a representative operation, commercial controls of corn plants (*Zea mays*) are obtained by applying aqueous spray compositions containing 10 pounds of a phthalide having the structure

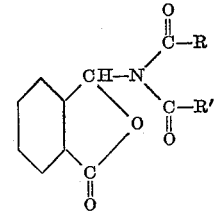

per 100 gallons of dispersion.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid and ferric chlorde solution, as more fully disclosed in U.S. Patent 2,748,162.

The acid amides to be employed as starting materials, as previously described, may be prepared by any of several known methods. A convenient method for preparing the cyclic imides is to heat the corresponding acid anhydride with ammonia and recover the desired imide as residue. The non-cyclic diacyl derivatives of ammonia may be prepared by treating an acid amide with an acid chloride in an inert solvent such as benzene. Following the reaction, the product may be recovered by removing the solvent and purifying by conventional procedures.

This application is a continuation-in-part of our copending application Serial No. 597,065, filed July 11, 1956, now abandoned.

We claim:
1. A phthalide having the structure

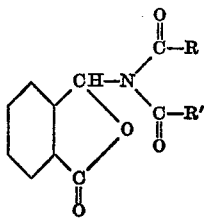

wherein R and R' are selected from the group consisting of phenyl and lower alkyl radicals containing from 1 to 4 carbon atoms, inclusive, and R and R' when taken together are selected from the group consisting of phenylene and naphthylene radicals attached through valences in adjacent exposed positions in the aromatic nucleus, alkylene radicals containing from 2 to 3 carbon atoms, inclusive, and alkenylene radical containing 2 carbon atoms.

2. 3-phthalimidophthalide.
3. 3-succinimidophthalide.

No references cited.